United States Patent [19]
Ito et al.

[11] Patent Number: 6,030,200
[45] Date of Patent: *Feb. 29, 2000

[54] ELECTRIC INJECTION MOLDING MACHINE

[75] Inventors: Susumu Ito; Mitsushi Yoshioka, both of Yamanashi, Japan

[73] Assignee: Fanuc Ltd., Yamanashi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,678

[22] Filed: Mar. 20, 1997

Related U.S. Application Data

[63] Continuation of application No. 08/507,616, Jul. 26, 1995, abandoned.

[30] Foreign Application Priority Data

Aug. 5, 1994 [JP] Japan ................................. 6-203046

[51] Int. Cl.⁷ .................................................. B29C 45/80
[52] U.S. Cl. .................................................... 425/150
[58] Field of Search .............................................. 425/150

[56] References Cited

U.S. PATENT DOCUMENTS

| | | | |
|---|---|---|---|
| 4,902,220 | 2/1990 | Nakagawa | 425/590 |
| 4,988,273 | 1/1991 | Faig et al. | 425/150 |
| 5,057,255 | 10/1991 | Sato et al. | 425/150 |

OTHER PUBLICATIONS

Joseph Ogando, A New Way to Look at Hydraulic Oil Cleanliness, Plastics Technology, pp 42–45, Dec. 1993.

Cincinnati Milcaron advertisement, Plastics Technology, Dec. 1994.

*Primary Examiner*—Tim Heitbrink
*Attorney, Agent, or Firm*—Staas & Halsey LLP

[57] ABSTRACT

An electric injection molding machine having a high degree of freedom in design, in which the design change of a part of the injection molding machine does not influence the whole design of the machine. The various layouts can be selected in accordance with a space in a factory in which the machine is to be installed. A base for a mechanical component and a housing for an electric component are provided separately and independently. A clamping unit and an injection unit of the mechanical component is mounted on the base. A power unit for supplying the mechanical component with electric power and a control unit for controlling the mechanical component of the electric component are accommodated in the housing. The mechanical component and the electric component are combined to constitute the injection molding machine in accordance with various arrangement patterns.

10 Claims, 4 Drawing Sheets

ELECTRIC INJECTION MOLDING MACHINE

This is a continuation of application Ser. No. 08/507,616, filed Jul. 26, 1995, now abandoned.

BACKGROUND OF THE INVENTION

1. Field of the Invention

The present invention relates to an electric injection molding machine in which a clamping unit and an injection unit are driven by electric motors.

2. Description of Related Art

An electric injection molding machine comprises a mechanical component and an electric component. The mechanical component includes a clamping unit for clamping molds and an injection unit for plasticizing resin and injecting the plasticized resin into the molds. The electric component includes a power unit for supplying an electric power to the mechanical component and a control unit for controlling the mechanical component. When the injection molding machine is of a horizontal type, the clamping unit and the injection unit are mounted on a box-shaped base in confronting relation with each other and the electric component is accommodated In the base. Thus, the conventional injection molding machine is constituted of the mechanical component and the electric component which are combined as a unit by means of the base.

In the above conventional electric injection molding machine, it is necessary to design the mechanical component, the base and the electric component coordinately with each other. Therefore, when the standards or dimensions of some part of the mechanical component or the electric component are changed according to the special request from a user, it is necessary to modify the design of the other parts.

As the electric component is ordinarily accommodated In a sealed housing with a cooling fan, It is laborious to assemble electric parts in the housing provided in the box-shaped base.

Further, as the relationship of mechanical component, the base and the electric component is fixed, only one arrangement pattern of these components Is possible for constituting the injection molding machine. Thus, the conventional injection molding machine has a low degree of freedom in installation in a factory and has a difficulty of assuring an operation space for an operator.

SUMMARY OF THE INVENTION

An object of the present invention is to provide an electric injection molding machine having a high degree of freedom in design, in which the design change of a part of the injection molding machine does not influence the whole design of the machine and various layout can be adopted in installation in a factory.

An electric injection molding machine according to the present invention comprises: a mechanical component having a clamping unit, an injection unit and a base for mounting the clamping unit and the injection unit thereon; an electric component having a power unit for supplying electric power to the mechanical component, a control unit for controlling an operation of the mechanical component, and a housing for accommodating the power unit and the control unit; and a connecting cable for electrically connecting the mechanical component with the electric component, wherein the base for the mechanical component and the housing for the electric component are provided separately and independently.

The base may be comprise a plane plate member. A rigid frame member may be disposed under the plane plate member so as to place the mechanical component at an appropriate level. The housing for the electric component may have a rigid frame structure. The mechanical component may be disposed on the housing for the electric component. The mechanical component and the electric component may be disposed adjacent to each other or remote from each other. An auxiliary frame may be provided on the base and the electric component may be mounted on the auxiliary frame. Further, the clamping unit and the injection unit may be arranged vertically.

DETAILED DESCRIPTION OF THE PREFERRED EMBODIMENT

Figure 1:
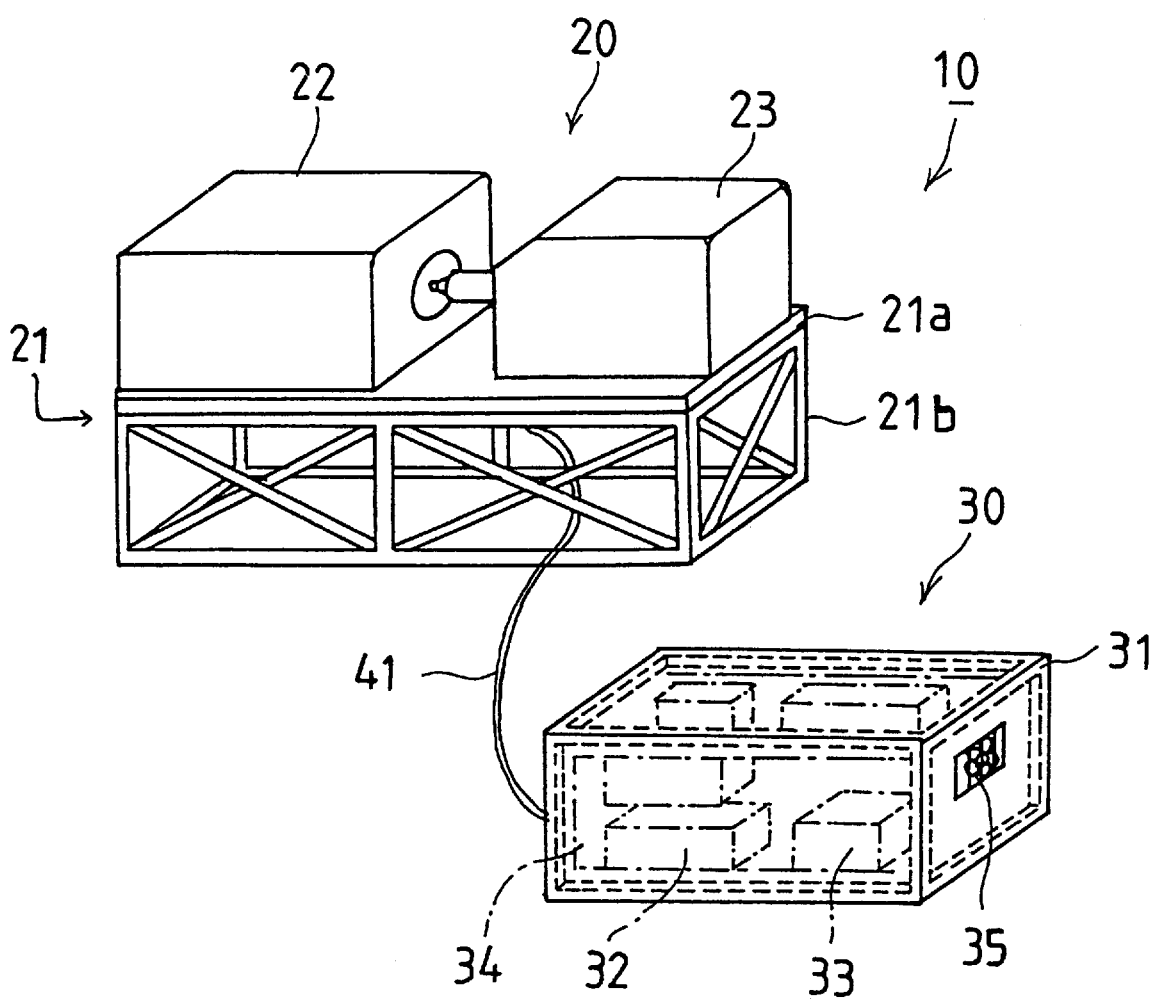
FIG. 1 is a perspective view of an injection molding machine according to an embodiment of the present invention.

As shown in FIG. 1, an electric injection molding machine 10 comprises a mechanical component 20 and electric component 30 provided separately with each other. The mechanical component 20 is mounted on a base 21 and the electric component is accommodated in a housing 31. The mechanical component 20 has a clamping unit 22 and an injection unit 23, which are horizontally arranged on the base 21 in confronting relation with each other. The electric component 30 has a power unit 32 for supplying electric power to the mechanical component 20 and a control unit 33 for controlling an operation of the mechanical component 20.

In this embodiment, the base 21 comprises a substantially plane plate member 21a and a rigid frame member 21b disposed under the plate member 21a so as to place the mechanical component 20 at a level where an operator can easily operate the component 20.

The housing 31 for the electric component 31 has a rigid frame structure of a rectangular parallelepipedon and accommodates a power unit 32, a control unit 33, etc. mounted on a fitting panel 34. The power unit 32 is composed of a power board and a breaker, and a control unit 33 is composed of an input/output device, a NC device and a servo amplifier. A cooling fan 35 ventilates the housing 31 to discharge heat generated by the power unit 32, etc. out of the housing. A manual data input device and a data display device, which are not shown, are associated with the electric component 30.

The mechanical component 20 and the electric component 30 are electrically connected with each other by a connecting cable 41 having a power line and a signal line bundled together, to operate in the same manner as those of the ordinary injection molding machine.

Since the base 21 for the mechanical component 20 and the housing 31 for the electric component 30 are provided separately and independently, any dimension changes of the mechanical component 20 influence only the mechanical component 20 itself and do not give any influence on the electrical component 30. Also, when some dimensions of the electric component 30 are changed for increasing the electric power thereof, the mechanical component 20 does not have any influences from the change. Therefore, the mechanical component 20 and the electric component 30 can be designed independently to have a high degree of freedom in design. The electric component 30 is assembled in the housing 31 for the electric component 30, which is designed to be suitable to the dimensions of the electric component 30, whereas the electric component is assembled in the box-shaped base which is designed without taking account of the size of the electric component in the conventional injection molding machine.

Further, with the above arrangement of the electric injection molding machine 10, various arrangement patterns can be adopted by altering the placement and combination of the mechanical component 20 and the electric component 30.

Figure 2:
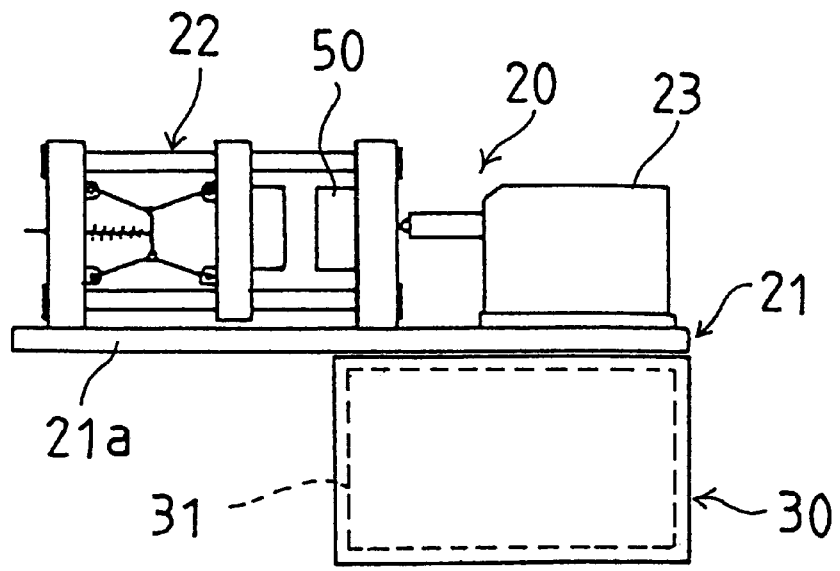
FIG. 2 is a front view of an injection molding machine according to a first arrangement pattern.

In a first arrangement pattern as shown in FIG. 2, a base 21 is disposed on the electric component housing 31 and the mechanical component 20 is mounted on the base 21. In this embodiment, the base 21 comprises only a plate member 21a. The electric component 30 is positioned under the Injection unit 23. Under the clamping unit 22 there is formed a space to be used for taking out the molded products.

Figure 3:
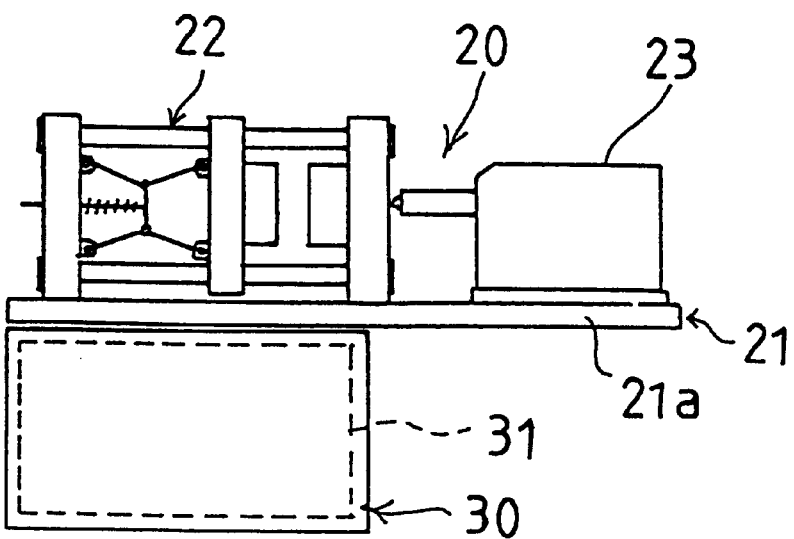
FIG. 3 Is a front view of an injection molding machine according to a second arrangement pattern.

In an arrangement pattern as shown in FIG. 3, the mechanical component 20 is disposed on the electric component housing 31 similarly to the arrangement in FIG. 2, but the electric component 30 is positioned under the clamping unit 22. In this arrangement pattern, it is necessary to take out the molded products from the upside or lateral sides of the clamping unit 22. However, as the clamping unit 22, which is heavier than the injection unit 23, is supported at a bottom portion thereof, various mechanisms of the injection molding machine are hardly distorted and a stable Injection molding machine is constituted.

Figure 4:
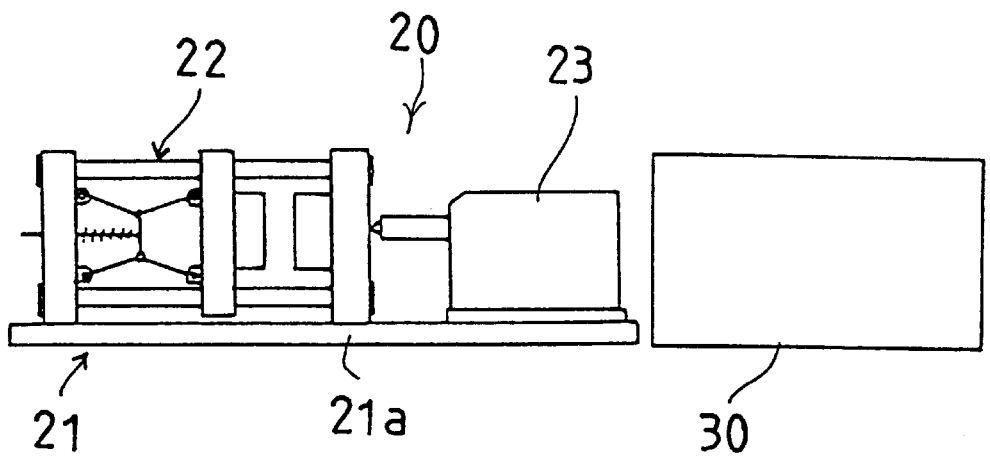
FIG. 4 is a front view of an injection molding machine according to a third arrangement pattern.

In an arrangement pattern as shown in FIG. 4, the mechanical component 20 and the electric component 30 are adjacent to each other and arranged to align laterally. In this arrangement pattern, both of the mechanical component 20 and the electric component 30 are made stable with a simple formation. Since the plate member 21a constituting the base 21 is directly placed on a floor, a small injection molding machine of this pattern would be arduous to operate but a large injection molding machine in this pattern is not arduous to operate because the mechanical component 20 of a large injection molding machine Is quite high. Also, the same effect is obtained when the mechanical component 20 and the electric component 30 are directly placed on the floor.

Figure 5:
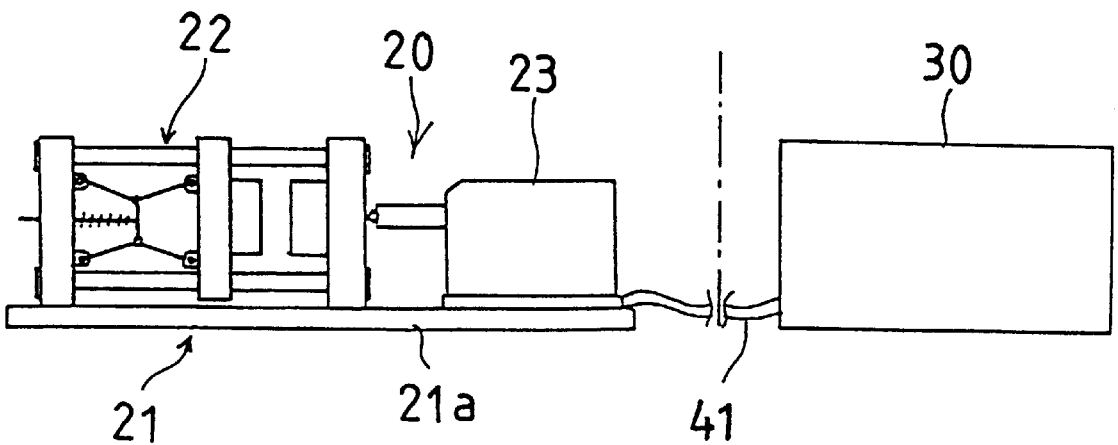
FIG. 5 is a front view of an injection molding machine according to a fourth arrangement pattern.

In an arrangement pattern as shown in FIG. 5, the electric component 30 is disposed in a place remote from the mechanical component 20. A space in a factory is effectively used although a long connecting cable 41 needs to be laid between the electric component 20 and the mechanical component 30. Further, in this arrangement pattern, when electric components of a plurality of injection molding machines are disposed at one place together and manual data input devices and data display devices associated with the electric components are collectedly arranged, a plurality of injection molding machines can be controlled by a few operators.

Figure 6:
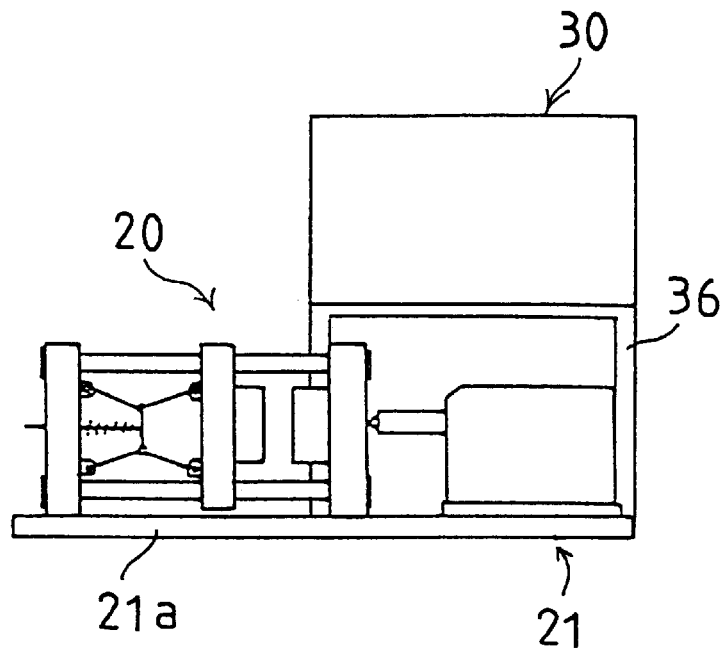
FIG. 6 is a front view of an injection molding machine according to a fifth arrangement pattern.

In an arrangement pattern as shown in FIG. 6, an auxiliary frame 36 is provided on the plate member 21a constituting the base 21 and the electric component 30 is mounted on the auxiliary frame 36. This arrangement pattern is the inverse of the arrangement pattern shown in FIG. 2. In this arrangement pattern, an injection molding machine of large size is made stable because the mechanical component 20 of large size and heavy weight is mounted on the floor.

Figure 7:
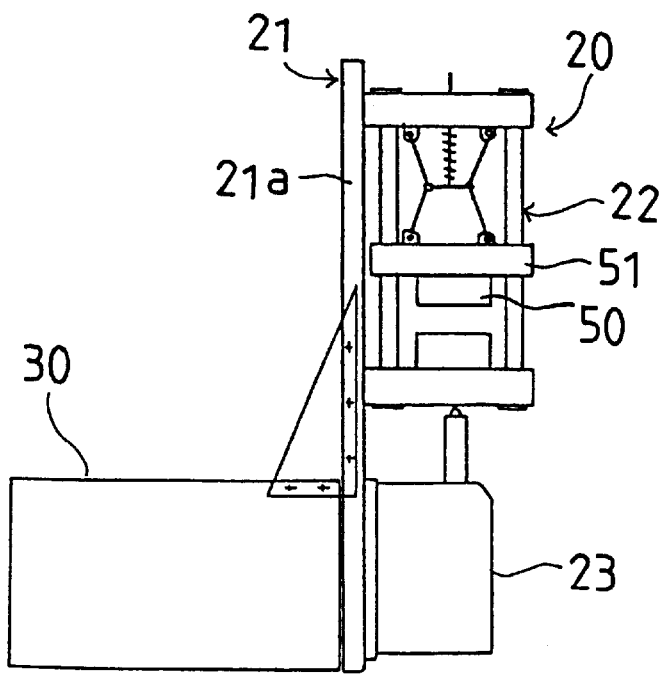
FIG. 7 is a front view of an injection molding machine according to a sixth arrangement pattern.

In an arrangement pattern as shown in FIG. 7, the mechanical component 20 is arranged vertically and the floor area necessary for installing the injection molding machine is reduced. In this arrangement pattern, a brake device (not shown) is necessary to prevent a mold 50 and a movable platen 51 from falling due to the gravity.

The scope of the present invention should not be limited to the concrete arrangement as shown in the drawings. For example, levellers may be provided between the base 21 and the floor in the respective patterns as shown in the drawings, if necessary.

According to the present invention, a degree of freedom is increased in designing the mechanical component and the electric component of the injection molding machine. As the electric component is independent form the mechanical component, the electric component can be easily assembled. The injection molding machine of various arrangement patterns is obtained using the same mechanical component and the same electric component. By selecting an arrangement pattern suitable to the place in which the injection molding machine is to be installed and by appropriately combining the electric component and the mechanical component, a variety of layouts can be obtained. An optimal layout for assuring an operation space can be obtained even in a limited space.

What is claimed is:

1. An electric injection molding machine, comprising:
   a mechanical component having a clamping unit and an injection unit which operate electrically, and a base for mounting said clamping unit and said injection unit thereon;
   an electric component having a power supply unit for supplying electric power to said mechanical component, a control unit including a numerical control device and a servo amplifier, for controlling an operation of said mechanical component, and a housing for accommodating said power unit and said control unit; and
   a connecting cable for electrically connecting said mechanical component with said electric component,
   wherein said base for said mechanical component and said housing for said electric component are provided separately and independently, so that said connecting cable, base, and housing enable said mechanical component to be repositioned relative to said electric component.

2. An electric injection molding machine according to claim 1, wherein said base comprises a plane plate member.

3. An electric injection molding machine according to claim 2, wherein said base further comprises a rigid frame member disposed under said plane plate member.

4. An electric injection molding machine according to claim 1, wherein said housing for said electric component has a rigid frame structure.

5. An electric injection molding machine according to claim 1, wherein said mechanical component is disposed on said housing for said electric component.

6. An electric injection molding machine according to claim 1, wherein said mechanical component and said electric component are arranged adjacent to each other.

7. An electric injection molding machine according to claim 1, wherein said mechanical component and said electric component are arranged remote from each other.

8. An electric injection molding machine according to claim 1, further comprising an auxiliary frame disposed on said base, wherein said electric component is mounted on said auxiliary frame.

9. An electric injection molding machine according to claim 1, wherein said clamping unit and said injection unit of said mechanical component are arranged to align vertically.

10. An electric injection molding machine comprising:
- a mechanical component mounted on a base comprising:
  - a clamping unit and an injection unit, each arranged horizontally on said base, in confronting relation with each other;
  - wherein said base comprises a substantially plane plate member and a rigid frame member disposed under the plate member; and
- an electric component accommodated in a housing comprising:
  - a power unit for supplying electric power to said mechanical component;
  - a control unit including a numerical control device and a servo amplifier, for controlling an operation of said mechanical component;
- wherein said housing comprises:
  - a rigid frame structure; a fitting panel; and a cooling fan; wherein said power unit and said control unit are mounted on said fitting panel; and
- a connecting cable for electrically connecting said mechanical component with said electric component,
- wherein said base for said mechanical component and said housing for said electric component are provided separately and independently, so that said connecting cable, base, and housing enable said mechanical component to be repositioned relative to said electric component.

* * * * *